Figure 1:
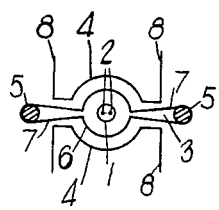

May 8, 1934.  E. Y. ROBINSON  1,958,349
GRID ELECTRODE OF VACUUM ELECTRIC TUBE DEVICES
Filed Aug. 23, 1930

INVENTOR
Ernest Y. Robinson
BY
ATTORNEY

Patented May 8, 1934

1,958,349

UNITED STATES PATENT OFFICE 1,958,349

GRID ELECTRODE OF VACUUM ELECTRIC TUBE DEVICES

Ernest Yeoman Robinson, Enfield, England, assignor to Associated Electrical Industries Limited, a company of Great Britain Application August 23, 1930, Serial No. 477,393
In Great Britain September 21, 1929

5 Claims. (Cl. 250—27.5)

This invention relates to grid electrodes of vacuum electric tube devices or valves.

It is known that grids of small cross-section give a high mutual conductance. It has been found that grids of circular cross-section give a greater mutual conductance than grids of flattened tubular form. There are several disadvantages inherent in grids of circular cross-section which disadvantages are increased when it is required that the cross-section shall be as small as possible.

In particular it is difficult to manufacture circular grids of small cross-section, owing to the small size of the mandrel through which a welding current must be passed when securing the helix to the support or backbone, and it is necessary to crank or otherwise displace the end of the backbone to which the helix is attached so that the backbone can conveniently be secured in the pinch. When the filament has a plurality of legs and it is desired to enclose each leg a plurality of grids must be employed. When the cathode is of large cross-section as for example in a valve having a cathode heated by conduction or radiation from an auxiliary member, the grid is readily heated by radiation from the cathode to a temperature at which it may emit electrons.

One object of the invention is to provide a grid of circular cross-section or of cross-section which is as far as possible similar to the effective cross-section of the cathode in order to increase the mutual conductance of the valve, and also to provide an increased heat conducting surface for the grid in a simple manner whereby its operating temperature can be reduced.

Other objects are to provide a grid construction having a comparatively massive backbone, whereby jig assembly may be used if desired, and to give a rigid construction said grid having an effective space current controlling portion of circular cross-section or of cross-section which is as far as possible similar to the effective cross-section of the cathode, whilst the diameter of the tubular space current controlling portion is small, the said construction being moreover such that the backbone preferably does not materially affect the electron stream of the valve and which controlling portion is spaced away in a simple manner from the backbone of the grid for the purpose of ease of assembly in manufacture.

According to the invention a grid is constructed of wire in helical formation each turn being secured to one or more backbones, the grid turns being so shaped that in themselves they provide an effective electrical enclosure of the cathode, said enclosure being preferably of similar cross-section to the effective cross-section of the cathode, whilst the grid wire is extended between the backbone and enclosure by a distance of not less than the minor cross-sectional dimension of the enclosure.

According to another feature of the invention the anode is so shaped in its active portion, namely, in the portion collecting the major portion of the space current, that it is similar in cross-section to that of the grid enclosure.

According to a further feature of the invention the extended portion of the grid wire is not confined by the anode whereby the effective operating temperature of the grid may be still further reduced.

Grids of the form above set forth may be made with facility by winding the grid wire helically around one or more supporting wires or backbones, with or without the use of a mandrel for giving to the helix a special preliminary shape, the wire being welded to the support wires, after which with the use of a mandrel or a differently shaped mandrel, the helix is pressed to the required cross-sectional shape.

Figure 5:
Figure 2:
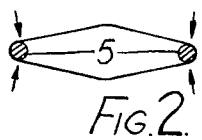
Figure 6:
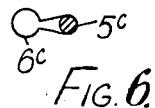
Figure 7:
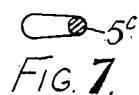
Figure 8:
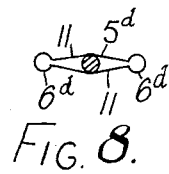
Figure 4:
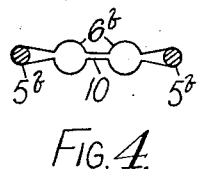
Figure 9:
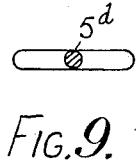

To enable the nature of the invention to be clearly understood several grids constructed in accordance therewith will now be described with reference to the accompanying drawing in which Fig. 1 is a sectional plan view of one electrode structure, Fig. 2 being a similar view of the grid showing its preliminary shape and Fig. 3 a similar view of the grid pressed to its final shape. Figs. 4, 6 and 8 are sectional plan views of three other grids in accordance with the invention whilst Figs. 5, 7 and 9 show respectively the preliminary shape of the grid helix for the grids shown in Figs. 4, 6 and 8.

In Fig. 1 an equipotential cathode 1 containing an insulated heater 2, is located within a grid 3 which is substantially enclosed within an anode consisting of two similar plates 4. The grid 3 comprises a helix having the cross-sectional shape shown in Figs. 1 and 3, the helix being supported upon parallel wires 5. It will be seen that the grid 3 comprises a central tunnel 6 of circular cross-section and two lateral portions 7 which extend beyond the confines of the anode, the central or effective portion 4 of which is also of circular section, the anode in the form illustrated having webs 8 which may constitute radiating fins. With the construction shown heat received by the central portion 6 of the grid by radiation from the cathode is conducted outside the anode and can then be freely radiated so that the grid will remain desirably cool. The grid shown in the structure illustrated by Fig. 1 is preferably formed by winding the grid helically around the two support wires 5 whilst the latter are held in a jig. A mandrel (not shown) being located between said support wires and also held in jig so that the grid wire receives the shape illustrated in Fig. 2. The grid wire during or after being wound around the support wires 5 is preferably welded to each support wire along two lines of contact, as indicated by the arrows, in accordance with the invention of Patent No. 1,720,443 of 9th July 1929. The grid so far constructed is then pressed to the final shape shown separately in Fig. 3, a mandrel being located in the centre of the helix so that a tunnel portion 6 is formed. The junction between the tunnel portion and the lateral portions 9 need not touch one another but the gap should be small.

Figure 3:
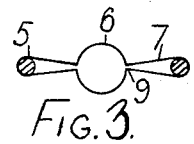
Figure 4:
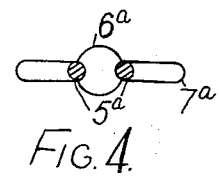

In Fig. 4 is shown an arrangement of grid which is generally similar to that shown in Figs. 1 and 3 except that there are two similar tunnels 6$^b$ spaced apart by a central portion 10, the support wires 5$^b$ being outermost. Each tunnel 6$^b$ is adapted to have centrally within it a cathode.

The grid shown in Fig. 4 is conveniently wound to the preliminary shape shown in Fig. 5, the turns being secured by welding to the support wires 5$^b$ as described with reference to Fig. 3, after which the helix is pressed to the shape shown in Fig. 4, two mandrels being employed for determining the shape and size of the tunnel portions 6$^b$.

There may be a single support wire 5$^c$ and a single tunnel 6$^c$ as shown in Fig. 6. For this construction a helix may be wound to the preliminary shape shewn in Fig. 7, secured by welding along two lines of contact to the support wire 5$^c$, and then pressed to the shape shewn in Fig. 6 with the aid of a mandrel.

In Fig. 8 is shewn another form of grid in which there is a single supporting wire or backbone 5$^d$ and two tunnel portions 6$^d$ spaced from the support wire 5$^d$ by laterally extending portions 11. The grid shewn in Fig. 8 is conveniently formed to the preliminary shape shewn in Fig. 9 and afterwards pressed with the aid of two mandrels in the manner previously described.

It will be understood that various modifications may be made without departing from the scope of the invention.

I claim:—

1. A space current device grid electrode comprising at least one supporting rod, and a wire helix wound around said supporting rod and the turns of which are each secured to said supporting rod, the cross section of said helix being deformed to provide by its turns at least one substantially circumferentially closed tunnel to substantially completely surround a cathode, said deformed helix also comprising at least one strut-like integral lateral portion extending freely between said tunnel and supporting rod a distance not less than the minor cross-sectional dimension of said tunnel.

2. A vacuum tube enclosing a thermionic cathode, a grid electrode comprising at least one supporting rod and a wire helix the turns of which are each secured to said supporting rod and the cross section of which is deformed to provide by its turn a substantially circumferentially closed tunnel which substantially completely surrounds said cathode, said deformed helix also comprising at least one strut-like integral lateral portion extending freely between said tunnel and supporting rod, and an anode having an active portion of substantially similar cross-sectional shape to that of said tunnel of the grid electrode.

3. A vacuum tube enclosing a thermionic cathode, a gapped anode, and a grid electrode located between said cathode and anode and comprising in cross-section a tunnel which substantially completely surrounds said cathode, said grid electrode also comprising in cross section at least one integral lateral portion extending laterally from said tunnel beyond the confines of said anode through the gap in the latter.

4. A space current device grid electrode comprising a pair of supporting rods, and a wire helix wound around said supporting rods and the turns of which are each secured to said supporting rods, the cross section of said helix being deformed to provide by its turns a pair of substantially circumferentially closed tunnels to substantially completely surround respective cathode elements, a strut-like integral lateral portion extending freely between each tunnel and a supporting rod, and an integral flat lateral separating portion between and spacing apart said pair of tunnels.

5. A vacuum tube enclosing a thermionic cathode, a grid electrode consisting of at least one supporting rod and a wire helix the turns of which are each secured to said supporting rod and which is deformed in cross section to provide by its turns a tunnel which substantially completely surrounds said cathode and has a substantially similar cross-sectional shape to that of said cathode, and to also provide by its turns at least one strut-like integral lateral portion extending freely between said tunnel and supporting rod, and an anode having an active portion of substantially similar cross-sectional shape to that of said tunnel of the grid electrode, said anode having at least one gap through which said lateral portion extends, and said grid supporting rod being located outside the confines of said anode.

ERNEST YEOMAN ROBINSON.